US008137089B2

(12) United States Patent
Schikowski et al.

(10) Patent No.: US 8,137,089 B2
(45) Date of Patent: Mar. 20, 2012

(54) PUNCH FOR A ROTARY PRESS

(75) Inventors: Jürgen Schikowski, Schwarzenbek (DE); Friedrich Meissner, Hamburg (DE); Jan Naeve, Schattin (DE); Harald Römer, Reinbek (DE); Reinhard Wagner, Büchen (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 12/417,392

(22) Filed: Apr. 2, 2009

(65) Prior Publication Data

US 2009/0269433 A1 Oct. 29, 2009

(30) Foreign Application Priority Data

Apr. 23, 2008 (DE) ......................... 10 2008 020 748

(51) Int. Cl.
*B29C 43/08* (2006.01)

(52) U.S. Cl. ......................................... 425/78; 425/345

(58) Field of Classification Search .................... 425/78, 425/344–345, 352–355
See application file for complete search history.

(56) References Cited

U.S. PATENT DOCUMENTS

| | | | | |
|---|---|---|---|---|
| 5,699,273 | A | 12/1997 | Hinzpeter | |
| 6,106,262 | A * | 8/2000 | Levin et al. | 425/345 |
| 7,581,941 | B2 * | 9/2009 | Harada et al. | 425/345 |
| 2004/0056375 | A1 | 3/2004 | Bubb | |
| 2004/0131717 | A1 * | 7/2004 | Shimada et al. | 425/345 |

FOREIGN PATENT DOCUMENTS

| | | |
|---|---|---|
| DE | 1783564 | 2/1959 |
| GB | 831074 | 3/1960 |
| JP | 5084277 | 4/1993 |

* cited by examiner

*Primary Examiner* — Richard Crispino
*Assistant Examiner* — Thukhanh Nguyen
(74) *Attorney, Agent, or Firm* — Vidas, Arrett & Steinkraus

(57) ABSTRACT

A punch for a rotary press, which has a shaft and a head, wherein the head has an upper mirror surface, a cylinder surface and a rounded transition area between the mirror surface and cylinder surface with a first and a second radius, wherein the first radius is larger than the second radius and wherein the punch head also has a preferably conical transition area from the cylinder surface to the shaft, wherein the diameter of the head is less than 25 mm and the first radius of the transition area is selected such that its height is less than half the height of the cylinder surface.

12 Claims, 1 Drawing Sheet

PUNCH FOR A ROTARY PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Rotary presses for the production of tablets and similar pellets have upper and lower punches, which work together with die holes in a die plate in order to process filled-in powder into pellets. The molds with which the punches work are called dies and are fastened in holes of the die plate as separate sleeve-like inserts. However, it is also known to combine the die plate from segments and to produce the mold holes directly in the segments. (Although dies are not used for these types of segments, the plate, which is comprised of the segments, is still called a die plate.) The use of segmented die plates has the advantage that in the case of a change in the mold of the pellet the removal of the dies and the installation of new dies can be omitted. Moreover, the dies require a relatively large amount of space so that they restrict the number of mold holes on a specified reference circle. The number of mold holes in a die plate without die inserts is naturally larger.

Press punches of the named type have a punch head and a shaft. The punch head has a mirror surface on the top side, which works together with compression rollers in the rotary press. The diameter of the mirror surface determines the pressure hold time of the press punches, i.e. in the case of a given speed the time when the press punches work together with the powder to be pressed. The press punch heads also have a cylinder surface, and a rounded transition is arranged between it and the mirror surface, wherein the transition has a relatively large radius in order to let them first come into gradual effect when the compression rollers are lowered. On the bottom side, the punch heads transition into the shaft in a mostly conical section.

The mass of the punch of a rotary press and the associated inertia are a limiting factor for the machine speed and are also significant for the wear of punch heads and curves working together with them. Moreover, an unfavorable interaction results between the compression roller and the punch head through uneven transition of the compression roller from one punch head to the next. This causes considerable noise emission and wear on the punch and compression roller.

The geometric design and dimension of punch heads for rotary presses are standardized (DIN ISO 18084:2006-09). The diameter of the head, which is determined by the cylinder surface, is then either 25.27 or 31.6 mm, the diameter of the mirror surface is 9.6 or 16 mm, the diameter of the shaft is 19 or 25.35 mm and the height of the head is 8.15 mm.

The object of the invention is to create a punch for a rotary press, in which a smaller size is achieved, thus enabling a smaller separation distance of the punches. The noise emission can also be reduced.

BRIEF SUMMARY OF THE INVENTION

In the case of the punch according to the invention, the diameter of the head is less than 25 mm, and the first radius of the first transition area is selected such that the height of the first transition area is less than half the height of the cylinder surface.

In the case of the invention, the radius of the transition area between the mirror surface and the cylinder surface is relatively small compared to the standardized punch head. In the case of the latter, this radius is 16 mm. In accordance with one embodiment of the invention, the first radius is smaller than 14 mm, preferably in the range of 9 to 11 mm.

The standardized punch head has a very small radius of 0.8 mm between the rounded transition and the cylinder surface. In accordance with one embodiment of the invention, the second radius is at least one-fifth the size of the first radius, preferably one-fourth of the first radius. According to another embodiment of the invention, the second radius is 2 to 3 mm, preferably 2.5 mm.

In accordance with another embodiment of the invention, the height of the cylinder surface corresponds with at least half the height of the punch head. In accordance with another embodiment of the invention, the ratio of the height of the cylinder surface to the total height of the punch head is somewhat less than 0.5, e.g. 0.47-0.48. (When the height of the punch head is discussed above and below, this refers to the total height of the head from the mirror surface to the shaft).

The diameter of the shaft of the punch according to the invention is also relatively small. As already mentioned, it is usually 19 or 25.35 mm. In accordance with one embodiment of the invention, the diameter of the shaft is <19 mm. The diameter is preferably less than 14 mm, preferably between 11 and 13 mm.

In accordance with another embodiment of the invention, the ratio of the diameter of the shaft to the diameter of the mirror surface is less than 1.7, preferably approx. 1.5.

The punch according to the invention can preferably be applied to segmented die plates, which have mold holes without mold inserts (dies). In accordance with one embodiment of the invention, it is provided for this that the center distance of the punch on the reference circle of the mold holes is less than 20 mm.

With the help of the invention, the number of stations can be increased on a certain reference circle. The mass of the punch is also reduced. This also reduces the wear on the punch heads and curves. The exact radii transition of the punch head not only enables the considerable mass reduction, but also a more uniform transition of the compression roller from one punch head to the next. This reduces the noise emission and also the wear on the punches and compression rollers.

BRIEF DESCRIPTION OF EACH OF THE FIGURES OF THE DRAWINGS

One exemplary embodiment of the invention is explained in greater detail below.

DETAILED DESCRIPTION OF THE INVENTION

Figure 1:
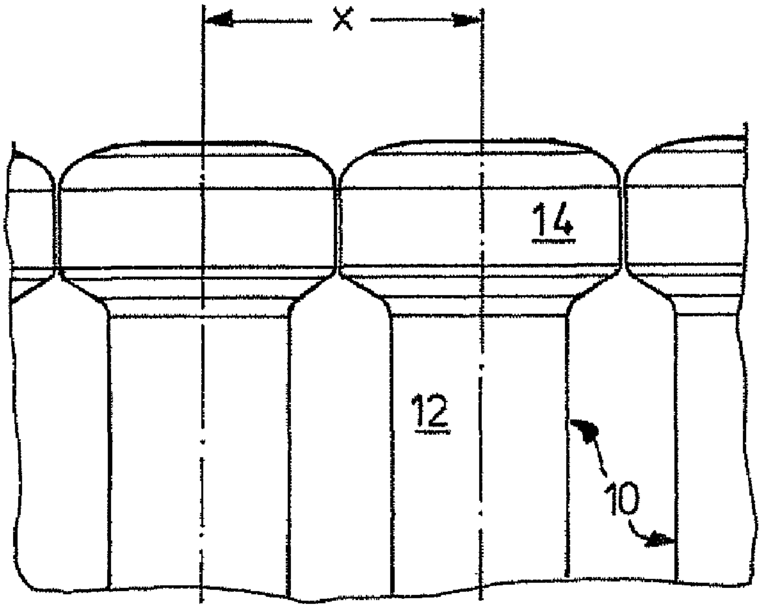
FIG. 1 shows several upper punches of the invention arranged in a row.

While this invention may be embodied in many different forms, there are described in detail herein a specific preferred embodiment of the invention. This description is an exemplification of the principles of the invention and is not intended to limit the invention to the particular embodiment illustrated FIG. 1 shows several punches 10 with a shaft 12 and a punch head 14. They are arranged in a punch guide of a rotor of a rotary press, which is not described or shown in greater detail. Such rotary presses are generally known so that they can be referenced here. The punches 10 work together with mold holes of a die plate (also not shown), which is rotated together with the punches 10 around a vertical axis. In compression stations, at least one compression roller works together with the punch heads 14 in order to press the punch shafts or the press insert of the punch shafts into the mold holes in order to press therein contained powder to form a pellet. This is also not shown and is assumed to be known.

As can also be seen in FIG. 1, the punch heads 14 have a very small separation distance. The center distance of the punch shafts 12 or the punch heads 14 is labeled with X in FIG. 1.

Figure 2:
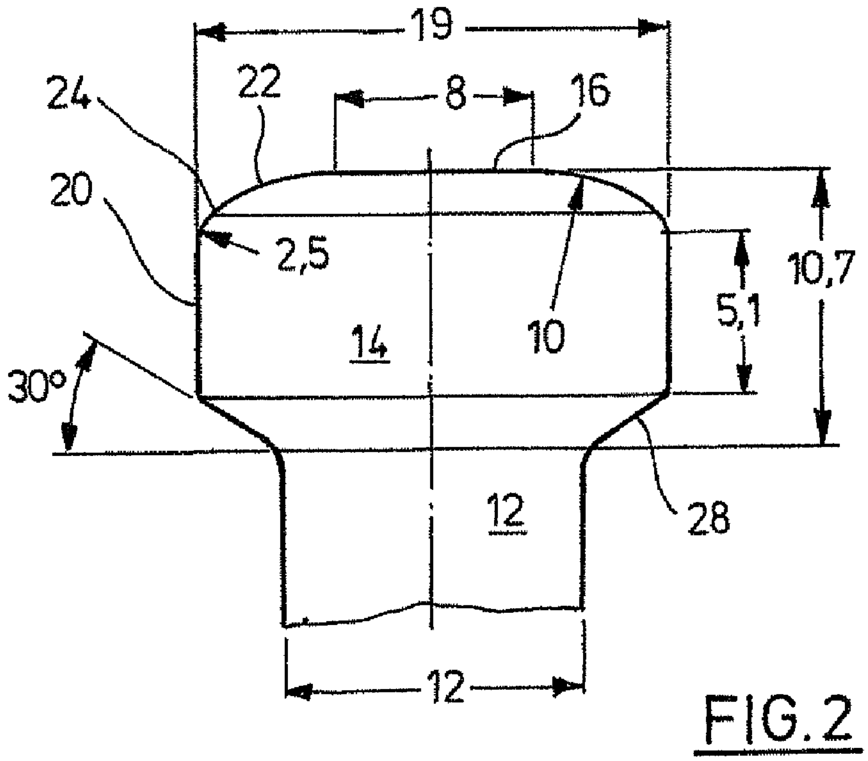
FIG. 2 shows an enlarged punch head of the punch according to FIG. 1.

A punch according to FIG. 2 is described in greater detail below. Punch head 14 and punch shaft 12 are provided with measurements. The measurements are in millimeters. The punch head 14 has an upper mirror surface 16 with a diameter of 8 mm. The punch head 14 also has a cylinder surface 20 with a diameter of 19 mm. A first transition area 22 with a radius of 10 mm is provided between mirror surface 16 and the cylinder surface 20. Another transition area 24 has a radius of 2.5 mm. A conical transition area 28 is formed between the cylinder surface 20 and the shaft 12 with a cone angle of 30°. The height of the cylinder surface 20 is 5.1 mm and the height of the punch head 14 is 10.7 mm. The diameter of the shaft is 12 mm.

The two radii of the transition areas 22 and 24 are relatively small and enable a small size for the punch head 14. The radii transition of the transition areas 24, 22 enables an optimal transition of the compression roller from one punch head to the next so that the wear and the noise emission are minimized. Overall, the punch head according to FIGS. 1 and 2 enables a small size and thus a reduced mass. The diameter of the mirror surface 16 thereby moves within the conventional range in order to maintain an even pressure hold time. The height of the cylinder surface 20 is also approximately the same with respect to conventional dimensions. The height of the two transition areas 24, 22 is clearly reduced, which results in the smaller size of the head. The diameter of the shaft 12 is also reduced with respect to conventional punch shafts so that the mass is also thereby reduced.

Based on the measurement of the punch according to FIGS. 1 and 2, a center distance X less than 20 mm is possible. In this manner, a very large number of punches can be arranged in a specified reference circle, wherein the production quantity increases per time unit.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A punch for a rotary press, the punch having a shaft and a punch head, wherein the head has an upper minor surface, a cylinder surface and first and second rounded transition areas between the mirror surface and cylinder surface, wherein the first rounded transition area has a first radius and he second rounded transition area has a second radius, wherein the first radius is larger than the second radius and wherein the punch head also has a preferably conical transition area from the cylinder surface to the shaft, wherein the diameter of the punch head is less than 25 mm and the first radius of the first rounded transition area is selected such that the height of the first rounded transition area is less than half the height of the cylinder surface, wherein the first radius is less than 14 mm, and wherein the second radius is at least one-fifth the size of the first radius.

2. The punch according to claim 1, wherein the first radius is in the range of 9 to 11 mm.

3. The punch according to claim 1, wherein the second radius is one-fourth the size of the first radius.

4. The punch according to claim 1, wherein the second radius is approx. 2 to 3 mm, preferably 2.5 mm.

5. The punch according to claim 1, wherein the height of the cylinder surface is at least almost half the height of the punch head.

6. The punch according to claim 5, wherein the ratio of the height of the cylinder surface to the overall height of the punch head is greater than 0.5.

7. The punch according to claim 1, wherein the conical transition area to the shaft is maximum one-fourth of the total height of the punch head.

8. The punch according to claim 1, wherein the diameter of the shaft is less than 19 mm.

9. The punch according to claim 8, wherein the diameter is less than 14 mm, preferably between 11 and 13 mm.

10. The punch according to claim 1, wherein the diameter/shaft to diameter/mirror surface ratio is less than 1.7, preferably approx. 1.5.

11. The punch according to claim 1, wherein by its use on a die plate, which is made up of individual segments and has mold holes without mold inserts (dies).

12. The punch according to claim 11, wherein the center distance of the punch on a reference circle of the mold holes is less than 20 mm.

* * * * *